Dec. 22, 1953  W. M. WINSLOW  2,663,809
ELECTRIC MOTOR WITH A FIELD RESPONSIVE FLUID CLUTCH
Filed Jan. 7, 1949  2 Sheets-Sheet 1
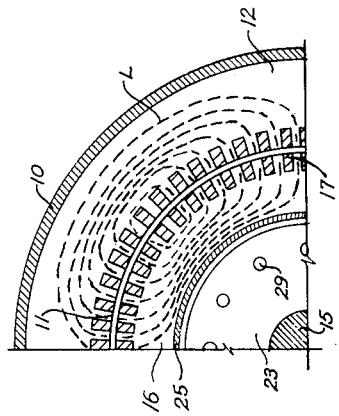
FIG.-2
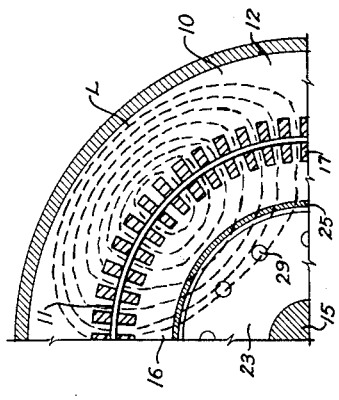
FIG.-3
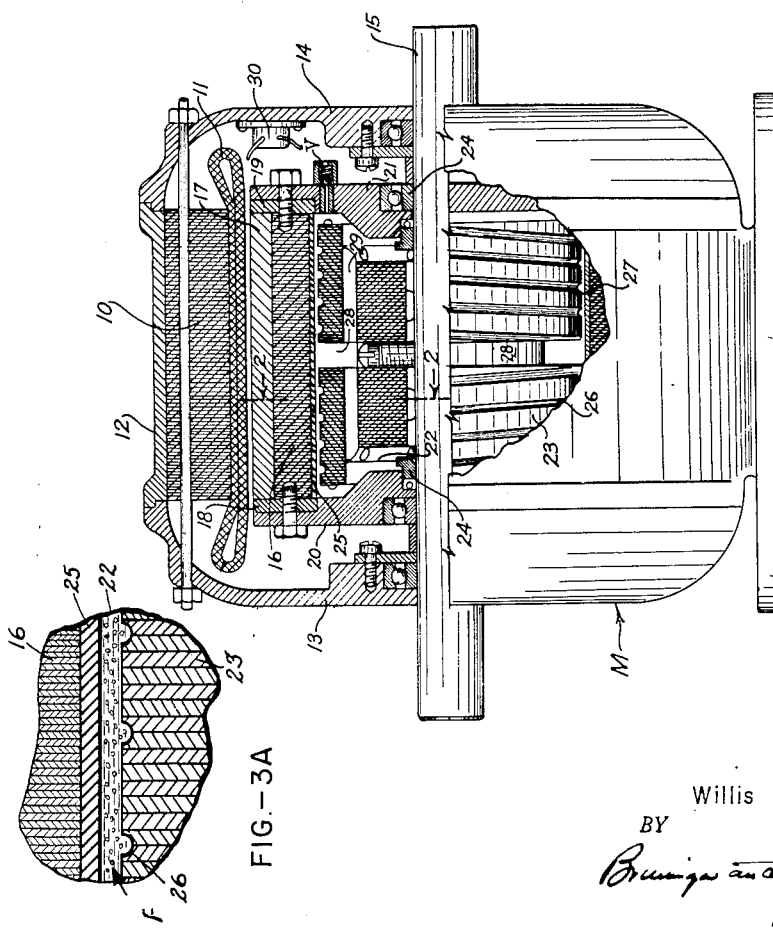
FIG.-1
FIG.-3A
*INVENTOR.*
Willis M. Winslow
BY
Brunigar and Sutherland
ATTORNEYS Dec. 22, 1953
W. M. WINSLOW
2,663,809
ELECTRIC MOTOR WITH A FIELD RESPONSIVE FLUID CLUTCH
Filed Jan. 7, 1949
2 Sheets-Sheet 2
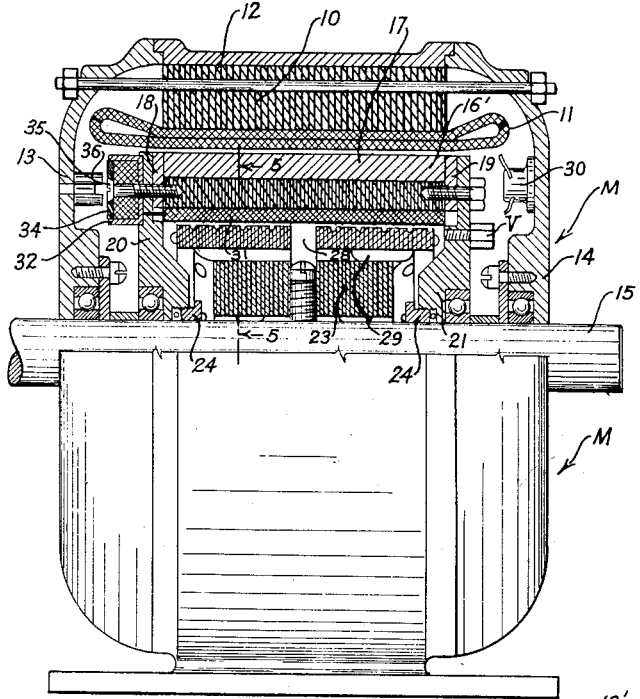
FIG.— 4
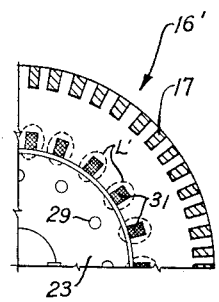
FIG.— 5
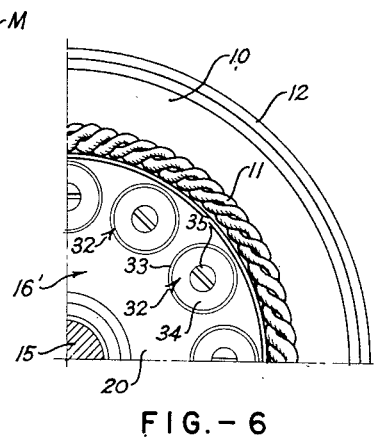
FIG.— 6
FIG.—7
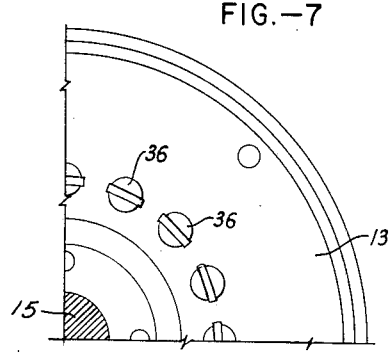
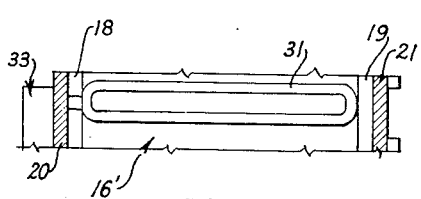
FIG.— 8
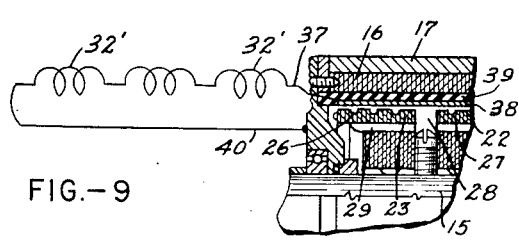
FIG.—9
*INVENTOR.*
Willis M. Winslow
BY
ATTORNEYS Patented Dec. 22, 1953

2,663,809

UNITED STATES PATENT OFFICE 2,663,809

ELECTRIC MOTOR WITH A FIELD RESPONSIVE FLUID CLUTCH

Willis M. Winslow, Wheatridge, Colo., assignor to Wefco Inc., Denver, Colo., a corporation of Colorado Application January 7, 1949, Serial No. 69,647

13 Claims. (Cl. 310—78)

This invention relates to improvements in electric motors and the like and more particularly to the embodiment therein of a field responsive fluid driving coupling means.

One of the objects of the invention is to so embody in an electric motor between its rotor or spinner armature and the driven shaft a field responsive fluid coupling which will have the flux field to which the fluid medium is responsive automatically controlled in accordance with speed of the rotor.

Another object is to so embody a field responsive fluid coupling in an electric motor that the coupling will become effective to automatically couple the rotor to the driven shaft so that the motor can pick up its load at a time when the rotor is approaching its full speed and thus permit stored rotating energy in the rotor to aid in picking up the load.

A further object is to so embody a field responsive fluid coupling in an electric motor between its rotor and a member driven thereby and so establish a variable flux field across the spaced relatively movable members of the coupling having the field responsive fluid medium therebetween that there will be an automatic increase in the intensity of the flux field and a resultant increased coupling action as the rotor approaches full speed.

Yet another and more specific object is to so associate a fluid coupling of the type having a fluid medium responsive to a magnetic field with the rotor and the driven shaft of an induction motor that the lines of magnetic force of the rotating magnetic field can be employed as the flux field to establish coupling action and cause the coupling action to increase as the speed of the rotor approaches synchronism.

A still further object is to employ the changing contour of magnetic lines of force of the rotating magnetic field of an induction motor to so establish a flux field between opposed surfaces of a field responsive fluid coupling that coupling action will occur as the rotor of the induction motor approaches its full speed.

A further object is to associate a field responsive fluid coupling with an electric motor and subject its fluid medium to a magnetic flux field which will automatically increase as the speed of the rotor of the motor approaches synchronism during starting.

A further object is to so associate a field responsive fluid coupling with an electric motor and automatically control its coupling action by the speed of the rotor that it can be designed to pick up a load with less starting current and automatically permit slippage to prevent motor overload.

A more general object is to produce an electric motor which will be more easily started and will operate smoother under varying load fluctuations.

Other objects of the invention will become apparent from the following description, taken in connection with the accompanying drawings illustrating by way of example only electric motors and associated field responsive fluid coupling embodying my invention.

Referring to the drawings:

Figure 1 is a side view of an induction motor with parts shown in both section and broken away, and having embodied therein a field responsive fluid coupling functioning in accordance with my invention;

Figure 2 is a cross sectional view taken on the line 2—2 of Figure 1, of one quarter of the motor of Figure 1 with illustrations of the conditions of the lines of magnetic force of the rotating fields which will be present when the rotor is beginning to rotate under starting conditions;

Figure 3 is another cross section view showing a quarter portion of the motor and illustrating the conditions of the lines of magnetic force when the motor is running with the rotor near synchronous speed;

Figure 3A is an enlarged view of a portion of the motor shown in Figure 3 and disclosing the liquid medium with particles interposed in the space between the rotor and the shaft.

Figure 4 is a side view of an induction motor, partly in section, showing another manner in which the field responsive fluid coupling can be controlled so that the coupling action can be caused to increase automatically in response to increasing speed of the rotor as it comes up to full speed;

Figure 5 is a cross sectional view of the rotor of the motor and the coupling as taken on the line 5—5 of Figure 4;

Figure 6 is an end view of a part of the motor as seen when the left end plate as viewed in Figure 4 is removed;

Figure 7 is a view of a part of the inside of the left end plate showing the manner in which the permanent magnets are mounted thereon; and Figure 8 is a view showing one of the magnetic field producing coils for the fluid coupling.

Figure 9 is a sectional view with a wiring diagram showing a modified manner of establishing an electrical flux field.

The principal feature of this invention is the embodiment in an electric motor of a field responsive fluid coupling which will be so automatically controlled that its coupling action will be responsive to the speed of the rotor or armature of the motor. The expression "field responsive fluid coupling," as used in connection with this invention, is meant a coupling having two relatively rotatable members in spaced relation, together with a liquid medium positioned in the space between said members which will be responsive to a flux field to thereby become shear resistant, that is, shear resistant to a greater degree than any normal shear resistance of the medium. The liquid medium comprises a liquid, which in itself is not affected by any flux field and small particles, either solid or semi-solid, entrained therein. The particles, when the medium is subjected to the flux field, will migrate so as to produce shear resistant chains and a consequent pronounced apparent reversible increase in the viscosity of the mixture. The term "flux field" is used herein in its broad sense and may mean either a magnetic flux field or an electrical flux field. If the flux field to which the medium is subjected is magnetic, then the particles which are entrained in the liquid must be, to some extent at least, magnetically conductive, and if the flux field is electric the particles must, to some extent, be electrically conductive or of high dielectric constant. The particular medium which is to be responsive to either a magnetic flux field or an electric flux field forms no part of the invention per se as such is covered by other of applicant's applications. In co-pending application Ser. No. 69,645, filed January 7, 1949, for Slip Control, reference is made to numerous examples of suitable media, some of which are responsive to a magnetic flux field and others which are responsive to an electrical field. One typical example of a medium responsive to a magnetic flux field is:

500 grams micron sized carbonyl iron powder
50 cc. oil #40
.4 gram aluminum tristrarate
1.8 grams aluminum distearate.
The aluminum soaps were heated with the oil before adding the iron powder.

A typical example of a medium responsive to an electrical flux field is:

100 grams Davidson's dry ground silica gel (milled in pebble mill)
15 cc. Arlacel C, Sorbitol sesquioleate
50 cc. kerosene deodorized
1.1 grams lauryl pyridinium chloride (Hooker Electrochemical Co.)
3.3 cc. ethylene glycol mono-ethyl ether "Cellosolve" (U. C. C. Co.)
5 grams white tin oxide
The materials were added to the kerosene-arlacel liquid as it circulated through the screw type pump.

Other mediums responsive to an electrical flux field are also disclosed in my co-pending application Serial No. 716,626, filed December 16, 1946, for Electro-Viscous Compositions, now abandoned.

The particular field responsive fluid coupling which is shown as being embodied in an electric motor in accordance with the invention covered by this application is one in which the medium is to be responsive to a magnetic flux field, but the disclosure is intended to be by way of example only, and when the term "field responsive fluid coupling" is employed it is intended that it shall not only include a coupling in which the medium thereof is responsive to a magnetic flux field, but also one in which the medium thereof is responsive to an electric flux field. In the two electric motors disclosed, by way of example, the field responsive fluid coupling is so embodied in the motor between the rotor or armature and the motor shaft which is to be driven that the control of the field coupling will be solely responsive to the speed at which the rotor is being rotated. In the embodiment shown in Figures 1, 2 and 3 the flux field which is to control the fluid coupling is obtained from the oscillating or rotating magnetic field of an induction motor and in the other example, shown in Figures 4 to 8, a controlling magnetic flux field is established by the generation of a current which will vary in accordance with the speed of the rotor, this flux field being capable of supplementing the flux field obtained from the rotating magnetic field or capable of being the sole control.

Referring first to Figures 1, 2 and 3, there is disclosed an induction motor generally indicated by the letter M. This motor may be either of the single, two or three phase type and have any number of desired poles. There is illustrated a four pole, three phase motor. The stator 10 of the motor is provided with windings 11 and is supported within a casing 12 having end covers 13 and 14 in which the shaft 15 of the motor is journaled by suitable bearings. Alternating current is supplied to the windings so that the poles established by the flow of current in the coils of the winding will become alternately north and south, thus giving in effect a rotating field and by means of which currents will be induced in the rotor 16 to cause it to rotate. This rotor 16 is shown as of the squirrel cage type, having windings consisting of short circuited bars 17 in its periphery. The bars are mounted in slots in the periphery of the rotor and are short circuited by end rings 18 and 19. The rotor is in the form of a hollow cylinder and the ends thereof are attached to end plates 20 and 21, whereby the rotor may be rotatably mounted by means of suitable bearings on the shaft 15 and thus capable of relative rotation with respect to the shaft. This construction establishes a chamber 22 within the rotor.

Since induction motors of the kind disclosed are well known, a detailed description of its operation is not believed necessary. The stator receives power from the line and the alternating current rotating field is then established. This rotating field will then cause induced currents to flow in the bars of the rotor. As these currents are in a moving magnetic field, they react with the flux producing them and cause the rotor to rotate. When the rotor is being started, the frequency of the induced current in the armature bars is high and as the armature increases in speed, the frequency of the induced currents will become lower. It is further well known that the lines of magnetic force established between the poles of the stator will have certain contours when the induction motor is being started and prior to the rotor coming up to speed. The lines of force will penetrate the rotor but will tend to have such contours as to follow a path along the periphery of the rotor. This results from the higher frequency and intensity of the induced currents in the rotor. In Figure 2 there is illustrated by dashed lines L the general contour of the lines of force of the resultant field at the time of starting the motor. It will be noted that the lines of force between poles will have a tendency to be deviated toward the periphery of the rotor.

As the rotor comes up to speed, the frequency and intensity of the induced currents in the rotor will decrease. The rotor's maximum speed, however, will be less than the speed of the rotating field, due to the inherent slip in an induction motor, all of which is well known. When the frequency of the induced currents in the rotor decreases, the magnetic lines of force L between poles of the rotating field will then tend to have their contour changed, with the result that they will deviate to a less degree toward the periphery of the rotor. The lines of force will then penetrate the rotor to a greater degree, that is, pass into the rotor from the periphery thereof a greater distance. In Figure 3 there is illustrated by dashed lines the contour of the lines of force when the rotor approaches its maximum speed, commonly known as synchronous speed. The change in contour of the lines of magnetic force is a well known phenomenon and in embodying my field responsive fluid coupling in an induction electric motor I employ this penetrating effect to control the effectiveness of the fluid coupling in transmitting torque. In other words, the magnetic flux responsive medium will be controlled by the magnetic flux established by the rotating magnetic field. As the rotor comes up to speed and there is a consequent change in contour of the magnetic lines of force established by the rotating field, these lines of force will be employed to pass between the two spaced members of the fluid coupling in which is positioned the magnetic flux responsive medium.

As further illustrated in Figures 1, 2 and 3, there is positioned in the chamber 22 established by the rotor and supporting end plates, one member of the fluid coupling which is in the form of a laminated cylinder of iron or the like and indicated by the number 23. The other member of the clutch is the rotor. The periphery of the member 23 is arranged to lie close to the inner annular surface of the rotor so that the gap between the periphery of the member 23 of the rotor will be small. The entire chamber containing the coupling member 23 will then be charged with a magnetic flux responsive fluid medium, an example of which has already been given. This fluid medium is shown in Figure 3a and indicated by the letter F. Member 23 will be keyed to the shaft 15 so that the shaft can be driven by the rotor whenever the fluid coupling is capable of transmitting torque. Suitable seals 24 can be provided between the shaft and the end plate members of the rotor so that the chamber containing the flux responsive medium will be liquid tight.

With the chamber 22 charged with the flux responsive medium, the medium will be in the space between the outer periphery of the member 23 and the rotor. The position of this space with respect to the rotating stator field will be such for any particular design of induction motor that there will be no lines of force, or very few lines of force, from the rotating magnetic field passing through the medium at starting conditions. Consequently, the viscosity of the mixture forming the medium will be substantially the same as it is in its normal state, that is, when not being subjected to magnetic lines of force. There will, therefore, be very little torque transmitted by the fluid coupling.

As the rotor comes up to speed and the frequency of the induced currents decreases, the contour of the lines of magnetic force of the rotating field will begin to assume the more oval shape illustrated in Figure 3 and there will take place a deeper penetration of the armature. This deeper penetration will then result in lines of magnetic force passing between the two opposed surfaces of the fluid coupling in which the thin film of the flux responsive medium is positioned. The medium will now become more shear resistant as a result of the particles entrained in the liquid having an attraction for each other with consequent congelation or fibration. With the medium becoming more shear resistant than normal, torque will then be transmitted from the rotor to the coupling member 23 and since the latter is keyed to the shaft, the shaft will begin to rotate. As the rotor speed increases and comes up to its maximum speed, the coupling will have the ability to transmit more torque. In a particular design this ability to transfer torque will be controlled by the deeper penetration of the lines of force from the rotating field so that the rotor will be caused to be "locked" to the shaft by the coupling when maximum speed of the rotor is attained.

It may be desirable to so control the penetration of the magnetic flux field so it will not be effective on the flux field responsive medium to an appreciable degree until the rotor begins to approach its maximum speed. In other words, the flux field should be so controlled that it will not act upon the medium and thus cause appreciable coupling action until the speed of the rotor is above 75 percent of its maximum or synchronous speed. To accomplish this there can be provided a shield on the rotor surface which is to be opposite the surface of the member 23 of the coupling. This shield, indicated at 25, is in the form of a tube and is of such diameter as to fit the inner cylindrical surface of the rotor. The material of the shield should be of electrical conducting metal such as copper or aluminum. The shield will prevent the lines of force from the rotating field from becoming effective upon the medium until there has been such a lowering of frequency of the induced current and an increase in intensity of the lines that the shield can be penetrated. These conditions occur only when the rotor speed approaches synchronous speed. When penetration of the shield takes place the medium will be so acted upon by lines of force from the magnetic flux field that it will become shear resistant and the rotor will be coupled to the shaft.

The fluid coupling member 23 which is keyed to the shaft 15 is shown as being provided in its peripheral surface with oppositely pitched helical grooves 26 and 27. The member is also provided with a medial annularly extending groove 28, the bottom of which is in communication with a series of passages 29 circumferentially arranged and extending through the member in an axial direction. The purpose of the helical grooves, the medial annular groove 28 and the axially extending passages 29 is all set forth in my co-pending application Serial No. 69,646, filed January 7, 1949, entitled Field Responsive Fluid Couplings, and are illustrated in this application in order that a coupling will be disclosed which is efficient in its operation. One purpose for the employment of the oppositely pitched helical grooves 26 and 27 is to provide for a circulation of the medium and thus prevent separation of the particles in the medium. The helical grooves will tend to cause the medium to be moved towards the end of the rotor, thus building up some pressure at these ends, which in turn will force fluid through the passages 29 to the medial groove 28 where it will again move into the space between the outer periphery of the coupling member and the rotor. The circulation, of course, will be more prevalent when the medium is being subjected to a flux field but not a "lock-in" flux field since, under such conditions, the medium has a high viscosity and there will be slip between the rotor and the coupling member 23. Of course, as the fluid becomes more congealed and "lock-up" takes place so that the fluid has a shear resistance in excess of load torque, then under such conditions there will be no circulation of the medium. Another reason for the helical grooves 26 and 27 is to establish a greater intensification of the flux field at the edges of the grooves with greater fibration at these edges. The result is a more efficient operating field responsive fluid coupling. This fibration at the edges of the grooves also aids in the over turning of the medium as the fibration will be less at the bottom of the grooves, with consequent lower viscosity at such point so that over turning can still take place, even though there is coupling action. Other purposes are described in the copending application and reference is made thereto for a more complete understanding of the construction which is illustrated.

When an induction motor has embodied therein a field responsive fluid coupling such as the one illustrated by way of example, there will be less difficulty in starting the motor under load conditions and also serious over load of the motor will be prevented. When the stator is energized to start the motor, maximum slip will be present between the rotor and shaft, due to the presence of the fluid coupling which, under such conditions, will not have its medium affected to any substantial degree by a magnetic flux field. Consequently, the rotor being substantially freely rotatable, will start to rotate easily and pick up speed rapidly due to the induced currents. As the speed of the rotor increases and begins to approach the speed of the rotating magnetic field of the stator, the frequency of the induced currents in the rotor will decrease and this will result in a contour change of the magnetic lines of force of the rotating field established by the stator windings. With this change in contour the lines of magnetic force begin to penetrate the space between the fluid coupling member 23 and the rotor in which is the thin film of the flux responsive media. As this penetration takes place the media will begin to congeal as a result of fibration taking place and increasing torque will be transmitted. This coupling action between the rotor and the coupling member 23 will then tend to rotate the shaft 15 and the load connected therewith will begin to be picked up. The maximum load, however, is not picked up until the rotor approaches its maximum speed, which will be the speed of the rotating magnetic field of the stator less the slip for the particular design of the induction motor. As the rotor is rotating at a high speed when load is beginning to be picked up, the rotor will have stored energy and this, upon coupling taking place, will aid in picking up the load and consequently there will be a reduction in time during which the starting current drawn by the motor will be present. When the rotor attains its maximum speed, the intensity of the magnetic field acting on the medium will also reach a maximum and this will be sufficient to "lock" the field responsive fluid coupling so that the rotor will be directly coupled to the shaft 15 and both will be rotating at the same speed. The load on the shaft 15 will thus be picked up gradually, thus permitting motor design where there will be a reduced motor starting current. If, at any time, the load on the shaft 15 should increase after the motor has picked it up, the rotor will decrease in speed. When such occurs there will be an attendant increase in the frequency of the induced current in the rotor and the lines of magnetic force of the rotating field will be effective to a less degree on the medium of the field responsive fluid coupling. Consequently, the medium will be less shear resistant and a slip will take place between the rotor and the coupling member 23. Since the rotor is now capable of slipping to some degree with respect to the shaft, damage to the motor will be prevented as high induced currents will not be established.

Whenever slip is present at the fluid coupling there will be a movement of the particles of the medium relative to each other and consequently heat will be created. If the slip is high and occurs for a long period of time, which is possible when a heavy over load occurs on the shaft (one that might stop the shaft), the heat generated may become so intense that damage to the motor will occur. This heat created by the slipping of the coupling can be employed to control the operation of a thermo overload relay and cut off the power to the motor. In Figure 1 there is illustrated a suitable cut-out relay indicated by the numeral 30. The connection of this relay in the line is not illustrated since the use of such relays and their manner of connection is well known. Heat from the fluid coupling which radiates to the relay will operate the relay and thus the power to the motor will be cut off. If there should be any danger of excessive vapor pressure developing in the chamber 22, a relief valve can be provided and is shown as V.

In some types of induction motors, due to their design, it may not be possible to obtain a sufficient magnetic flux field from the rotating field of the stator so that a fully "locked" coupling action can be obtained by the lines of force from the stator field. Thus, it may be desirable to supplement the magnetic flux which acts on the medium as a result of change in contour of the magnetic lines of force of the rotating field. To obtain this supplemental magnetic flux field and to have it occur in response to the speed of the rotor, I have illustrated in Figures 4 to 8 one suitable arrangement. The induction motor shown is the same as the one illustrated in Figures 1 to 3, insofar as construction of the stator and the fluid coupling is concerned. All the parts which are illustrated in Figures 1 to 3, which are a part of the motor shown in Figure 4, are indicated by like reference characters. The modified rotor is generally indicated by the numeral 16'. The inner cylindrical surface of the rotor is provided with a plurality of magnetizing coils 31 which extend axially of the rotor and are embedded in its inner surface. One of the coils is shown in detail in Figure 8. On one end plate, such as the end plate 20 of the rotor, there is attached a plurality of inductor coils 32. The inductor coils are suitably enclosed within a cup shaped member 33 having a cover 34 held in position by a screw 35 which also is employed to attach the inductor coil to the end plate. Each inductor coil is shown as electrically connected to a magnetizing coil so that any current which is induced into the inductor coil will flow through and excite the magnetizing coil and as a result a magnetic field will be established around the coil as indicated by the circular dashed lines L' in Figure 5. The inductor coils can, however, be otherwise connected in a well known manner with the magnetizing coils.

On the housing end cover 13 of the motor is attached a plurality of permanent magnets 36. The magnets may be of any number desired. If fewer or greater number are employed than there are inductor coils, a smoother coupling action will result. Due to a relative phase difference in the currents generated in coils 32, the flux from the magnetizing coils will not be intermittent and therefore there will be no resulting chatter. These magnets are arranged so there will be alternate north and south poles on their inner ends which face the inductor coils. The permanent magnets thus establish magnetic lines of force which can be cut by the inductor coils as they move with the rotor and as a result thereof current will be induced in the inductor coils. The current induced in the inductor coils will be a function in the speed of the rotor as is well known. In other words, the permanent magnets and the inductor coils act in the manner of a generator.

With an induction motor constructed as shown and having embodied therein the field responsive fluid coupling, the details of which have already been described in connection with the motor illustrated in Figures 1 to 3, it is believed to be apparent that when power is applied to the wound stator and the rotor comes up to speed, current will be induced in the inductor coils and this current will excite the magnetizing coils 31 and consequently establish a magnetic field around the inductor coils which will be effective on the medium of the fluid coupling. As the rotor increases in speed up to its synchronous speed, there will be an increase in the intensity of the field, resulting from the increased current exciting of the magnetizing coils, and this field will bring about the congelation of the field responsive medium to thus make the said medium more shear resistant. As less slip becomes present in the medium of the coupling, the load on the shaft 15 will be picked up and when the maximum or synchronous speed of the rotor is approached, the design will be such that the intensity of the field acting on the medium will cause the rotor to be "locked" to the shaft by the fluid coupling.

If the medium of the fluid coupling is close enough to the periphery of the rotor so that the lines of magnetic force from the rotating stator field can act upon the medium then the medium will be subjected to two different magnetic fields, one of which will aid or supplement the other. Each magnetic field will be a function of the speed of the rotor and the intensity of each will increase as the rotor approaches synchronous speed. Consequently, slip of the fluid coupling will decrease as the rotor comes up to speed and the load on the motor shaft will be picked up.

In the motors illustrated as embodying my invention a particular design of induction motor is disclosed. However, it is to be understood that the field responsive fluid coupling may be embodied in other types of motors as, for example, induction motors which have wound rotors for various purposes.

Where the flux field is to be established solely by the use of inductor coils and permanent magnets in order to produce a generated current for exciting magnetizing coils with the flux field responsive to the speed of the rotor, the fluid coupling can be embodied in any type of electric motor to thus minimize starting difficulties and prevent over loads.

Although the fluid coupling illustrated in the two examples is of the type which is responsive to a magnetic flux field, equivalent fluid couplings which are provided with a medium responsive to an electric flux field can also be employed. The medium can either be responsive only to an electric flux field or to both electric and magnetic flux field. Such mediums are disclosed in my copending application Ser. 205,010 filed January 8, 1950, which is a continuation of my application Ser. 716,626 filed December 16, 1946. In such fluid couplings of the latter type the electric flux field can be established by a generator similar to the one illustrated in Figure 4 wherein permanent magnets and inductor coils are employed. The induced potentials in the inductor coils can be then employed to establish by suitable connections the electric flux field across the two spaced coupling members having the medium positioned in the spaces. One way in which this can be done is illustrated in Figure 9. One lead wire 37 from inductor coils 32' is connected to a conductor cylinder 38 having a position in the rotor similar to that of the shield 25 shown in Figure 1 and being insulated from the rotor by insulation material 39. The other lead wire 40 from the inductor coils will then be connected directly to the rotor shaft. Thus, an E. M. F. will be delivered across the space between the rotor 16 and the cylinder 38 to establish the electric flux field.

Therefore, being aware of the possibility of modifications in the particular apparatus illustrated as embodying my invention and without departing from the fundamental principles involved, it is intended that the scope of the invention is not to be limited in any manner except in accordance with the appended claims.

What is claimed is:

1. In combination with an electric motor having a stator, a rotor and a shaft to be driven by the rotor, of a field responsive fluid coupling interposed between the rotor and shaft and comprising relative rotatable members carried by the rotor and the shaft and arranged in opposed spaced relation within the outlines of the rotor, a medium positioned in the space and comprising a liquid laden with particles so responsive to a magnetic field when established between the spaced members as to become mutually attractive and form a shear resistant substance between said spaced members, and means for establishing a magnetic field between the spaced members the intensity of which will be automatically increased and decreased in accordance with similar changes in the speed of the rotor.

2. In combination with an induction electric motor having a rotating field stator, a rotor and a shaft to be driven by the rotor, of a field responsive fluid coupling interposed between the rotor and shaft and comprising means providing an inner annular surface on the rotor together with means providing an outer annular surface rotatable with the shaft and spaced from the said inner annular surface, and a liquid medium positioned in the space between the annular surfaces and having the characteristic that upon being subjected to the flux of a magnetic field said medium will become shear resistant, said annular surfaces and the medium being in such proximity to the rotating field of the stator that the medium will be subjected to the flux therefrom and have its resistance to shear a function of the rotor speed.

3. In combination with an induction electric motor having a rotating field stator, a rotor and a shaft to be driven, of a field responsive fluid coupling interposed between the rotor and shaft and comprising spaced annular relatively movable surfaces carried by the rotor and shaft, the space between the annular surfaces being in proximity to the stator so that the magnetic flux from its rotating field can become effective to establish a magnetic field between said surfaces the lines of force of which will increase or decrease in response to similar changes in speed of the rotor due to the inherent characteristic of the flux paths to cause the rotating magnetic field to change its contour as the frequency of the induced current in the rotor changes, a medium positioned in the space between the surfaces and comprising a liquid laden with particles which upon being subjected to a magnetic field will become shear resistant and its shear resistance will vary as the lines of force of the magnetic field to which it is subjected varies, and a shield means of electrical conducting material interposed between the medium and the stator for controlling the effectiveness of the stator magnetic field on the medium.

4. In combination with an electric motor having a stator, a rotor and a shaft to be driven, of a field responsive fluid coupling within the rotor and interposed between the rotor and shaft and comprising spaced surfaces rotatable with the rotor and shaft and capable of relative rotary movement, a medium positioned in the space between the surfaces and comprising a liquid laden with particles which upon being subjected to a flux field will cause the medium to become shear resistant, and means for establishing a magnetic field between the surfaces by means of an induced current which is a function of the speed of the rotor.

5. In combination with an electric motor having a stator, a rotor and a shaft to be driven, of a field responsive fluid coupling within the rotor and interposed between the rotor and shaft and comprising spaced surfaces rotatable with the rotor and the shaft and capable of relative rotary movement, a medium positioned in the space between the surfaces and comprising a liquid laden with particles which upon being subjected to a flux field will cause the medium to become shear resistant, and means for establishing a magnetic field between the surfaces and comprising inductor coils positioned adjacent one of the surfaces for establishing a magnetic field effective between the surfaces by current flowing therein, and means for generating a current to flow in the coils which will be a function of the speed of the rotor.

6. In combination with an electric motor having a stator, a rotor and a shaft to be driven, of a field responsive fluid coupling within the rotor and interposed between the rotor and shaft and comprising spaced surfaces rotatable with the rotor and the shaft and capable of relative rotary movement, a medium positioned in the space between the surfaces and comprising a liquid laden with particles which upon being subjected to a magnetic field will cause the medium to become shear resistant, a plurality of magnetizing coils so positioned adjacent the medium that the medium can be subjected to its magnetic flux, and means for energizing the magnetizing coils including stationary permanent magnets and inductor coils rotatable with the rotor.

7. In combination with an induction motor having a rotating or oscillating field stator, a rotor and member to be driven, of a field responsive fluid coupling within the rotor and interposed between the rotor and driven member and comprising spaced relatively rotatable surfaces one of which is rotated by the rotor and the other with the driven member and a medium positioned in the space and comprising a liquid laden with particles which when subjected to a magnetic flux field will become shear resistant, and means for establishing a flux field for the medium which will have its intensity so varied in response to the slip of the rotor that as slip decreases the intensity increases.

8. In combination with an electric motor having a stator, a rotor and a shaft driven by the rotor, a field responsive fluid coupling interposed between the rotor and the shaft, and means positioning the responsive fluid of said coupling in the path of the magnetic flux of said rotor and between the driving and driven elements of said coupling.

9. In combination with an electric motor having a stator, a rotor and a shaft driven by the rotor, a field responsive fluid coupling interposed between the rotor and the shaft, means positioning the responsive fluid of said coupling in the path of the magnetic flux of said rotor and between the driving and driven elements of said coupling, and means for shielding said fluid from said flux below a predetermined speed of rotation of said rotor.

10. In combination, means producing a rotating magnetic field, means including a rotor in the path of said field and adapted to be rotated thereby, means including a second rotor in closely spaced relation to said first rotor, a fluid in the space between said rotors comprising a liquid and suspended particles attractable in the presence of a field to form a shear resistant medium, and means for causing the fluid to be subjected to such a field.

11. In combination with an electric motor having a stator, a rotor and a shaft to be driven by the rotor, of a field responsive fluid coupling interposed between the rotor and shaft and comprising relatively movable members carried by the rotor and the shaft and arranged in opposed spaced relation within the outlines of the rotor, a medium positioned in the space and comprising a liquid laden with particles so responsive to a flux field when established between the spaced members as to become mutually attractive and form a shear resistant substance between said spaced members, and means for subjecting the fluid to a flux field reaching therethrough from one member to the other and having its intensity controlled in response to speed changes of the rotor.

12. An electric motor comprising a stator, a rotor, a shaft to be driven, means providing a sealed chamber in the rotor having a cylindrical surface on the rotor and spaced from the shaft, a cylindrical member secured to the shaft and positioned in the chamber with its cylindrical surface closely adjacent the rotor cylindrical surface, a medium positioned in the chamber and the space between the cylindrical surfaces and comprising a liquid laden with particles which when subjected to a flux field will become shear resistant, and means for subjecting the medium to a flux field which will have its intensity varied in accordance with the speed of the rotor.

13. In combination with an electric motor having a stator, a rotor and a shaft driven by the rotor, a field responsive fluid coupling incorporated within the motor and interposed between the rotor and the shaft, and means for subjecting the coupling to a flux field which will be activated by energization of the motor and will have its intensity varied in accordance with the speed of the rotor.

WILLIS M. WINSLOW.

References Cited in the file of this patent

UNITED STATES PATENTS

| Number | Name | Date |
|---|---|---|
| Re. 22,434 | Winther | Feb. 1, 1944 |
| 664,190 | Thomson | Dec. 18, 1900 |
| 704,574 | Pintsch | July 15, 1902 |
| 854,709 | MacMillan | May 28, 1907 |
| 940,698 | Lamme | Nov. 23, 1909 |
| 1,988,922 | Stephenson | Jan. 22, 1935 |
| 1,995,605 | Downing | Mar. 26, 1935 |
| 2,012,509 | Hoddy | Aug. 27, 1935 |
| 2,223,210 | Hefel | Nov. 16, 1940 |
| 2,289,330 | Fischer et al. | July 7, 1942 |
| 2,417,850 | Winslow | Mar. 25, 1947 |

OTHER REFERENCES

National Bureau of Standards Technical Report 1213, March 1948, "The Magnetic Fluid Clutch," pages 8, 13, 14 and 16 and Figs. 7 to 10 in the appendix.